United States Patent [19]

Wurmfeld

[11] 4,311,010
[45] Jan. 19, 1982

[54] GAS-POWERED ENGINE ADAPTED TO UTILIZE STORED SOLAR HEAT ENERGY AND COMPRESSED GAS POWER SYSTEM

[76] Inventor: Charles J. Wurmfeld, 401 E. 65th St., New York, N.Y. 10021

[21] Appl. No.: 966,623

[22] Filed: Dec. 5, 1978

[51] Int. Cl.³ .......................................... F01K 25/10
[52] U.S. Cl. .................................. 60/641.8; 60/651; 60/671
[58] Field of Search ............... 60/682, 650, 407, 370, 60/325, 398, 412, 456, 651, 671, 508, 509, 641; 180/233

[56] References Cited

U.S. PATENT DOCUMENTS 2,966,776  1/1961  Taga ................................ 60/412 X
3,991,574  11/1976  Frazier ............................. 60/325 X

FOREIGN PATENT DOCUMENTS 2533099  11/1978  Fed. Rep. of Germany ........ 60/682

*Primary Examiner*—Allen M. Ostrager
*Attorney, Agent, or Firm*—Auslander, Thomas & Morrison

[57] ABSTRACT

Atmospheric fluids such as air and water are used to increase the power output of a gas compressor-gas engine system. Compression is aided by yielding heat over ambient atmospheric temperature. Gas from the compressor drives a gas engine. The gas engine gains power by absorbing heat energy from ambient atmospheric fluid. The warmed fluids and cooled fluids of the system may be usefully applied.

21 Claims, 6 Drawing Figures

H.P. AIR FROM CELLAR COMPRESSOR

GAS-POWERED ENGINE ADAPTED TO UTILIZE STORED SOLAR HEAT ENERGY AND COMPRESSED GAS POWER SYSTEM

The present invention relates to a gas-powered engine adapted to utilize stored solar energy and a multi-purpose compressed gas power generation system employing gases such as air or inactive gases.

The present invention utilizes a gas engine and a compressed gas power system to take advantage of the energy source available in the atmosphere at ambient temperature to obtain a greater energy output than the fuel energy input to the system, or at least a greater energy output than has been heretofore available from conventional energy fuel input in prior art power systems.

In the late 19th century, the advantages of compressed air for power transmission and use was recognized. Transmission of compressed air over long distances had been successfully accomplished and plans were made for hydroelectric generation of compressed air to be transmitted for power use. The hydroelectric plant never came to fruition, but in Paris in 1888, a compressor station, using the sewer system for transmission lines was successful. It was believed for a while that the then new Edison electrical system would never compete.

One advantage of air over steam, as a means of energy transmission and use, is that air can be transmitted at high pressures, but below ambient air temperature. This allows an energy inflow of heat from surrounding air into the compressed air, an energy gain which contributes to the useful work output.

In the case of steam, the temperatures may vary from 381° F. at 200 pounds per square inch to 140° F., at extreme vacuum. The entire range of temperatures are well above ambient temperatures resulting in a heat energy loss from the steam. The present invention takes advantage of the known phenomenon that expanding air can be below ambient air temperature. This difference in the properties of steam and compressed air is useful to consider in the transmission of power through piping systems. When steam flows through a pipe, friction is overcome by a pressure drop. Steam at high pressure must also be at high temperatuure. Heat flows out from the pipe, causing additional pressure drop and additional loss of energy from inlet to outlet. On the other hand, air can be produced at high pressure and comparatively low temperature close to ambient air at 60° F. to 70° F. As air drops in pressure it cools and absorbs the heat of friction. Also, heat flows into the pipe as the air in the pipe drops below ambient temperatures. This can result in one hundred per cent delivery of energy. Any loss can easily be made up by reheating it at the point of use of the energy since the piped air is at relatively low temperature.

Compressed air as a medium of energy transmission and use, has several other unique advantages. The transmission pipe involves no ecologic or other hazards as with oil, natural gas or liquified gas. The discharge from a gas engine is air, without the pollution problems of gasoline or diesel engines.

The present invention has been primarily concerned with air and atmospheric fluids such as water. Particularly in closed circuit systems of the present invention, compressed gas may be used in the manner that air is used. In such case it is advisable to use inactive gasses such as argon, helium or nitrogen.

The present invention utilizes a gas compressor and a gas engine to obtain a maximum power output from the energy input to the system. The energy savings is effected by fluid jacketing the gas compressor to utilize the heat energy from compressing the gas. The compressed gas is then available as power which can be stored and adapted to absorb energy from ambient air temperature as well as other solar sources when used in a gas engine.

One unique feature of the present invention is that where compressed gas is used for power, compression may be obtained from the direct drive of a steam turbine which requires very high speed for maximum efficiency without, the use of gears to reduce the speed of the steam turbine drive to be compatible with a normal electric generator. The high cost and power loss of reduction gears are both eliminated.

A gas engine operable with compressed gas, such as the compressed gas from the compressor of the present invention, is also preferably fluid jacketed to be able to cool ambient temperature atmospheric fluid for that fluid to yield its heat energy to the compressed gas to provide a greater power output than the potential energy in the compressed air alone.

Cooling of the compressor has the advantage of reducing the load on the prime mover and in addition to providing a useful product of heat energy. In contrast, heating the gas in the gas engine has the advantage of increasing the energy output of the gas engine in addition to producing a useful product of cool fluid.

According to the present invention, a gas power system including an atmospheric temperature fluid cooled gas compressor and an atmospheric temperature fluid warmed gas engine, draws energy from the ambient atmosphere for additional energy in the generation of power.

An advantage of the present invention is that the reservoir of solar generated heat in the atmosphere may be tapped from atmospheric fluid whether or not the sun is shining, day or night, clouds, rain or snow.

Energy from the power generation system of the present invention may be usefully stored in hot water, fluid or in compressed gas and the energy of cool fluid may be used.

Great efficiency is effected when used, cool, compressed gas from the gas engine can be recirculated to the intake of the compressor to reduce the energy necessary to drive the compressor in the production of compressed gas.

Although such novel feature or features believed to be characteristic of the invention are pointed out in the claims, the invention and the manner in which it may be carried out may be further understood by reference to the description following and the accompanying drawings.

The figures are exemplary of specific embodiments employing the elemental features of the present invention.

Referring now to the figures in greater detail, where like reference numbers denote like parts in the various figures.

Figure 1:
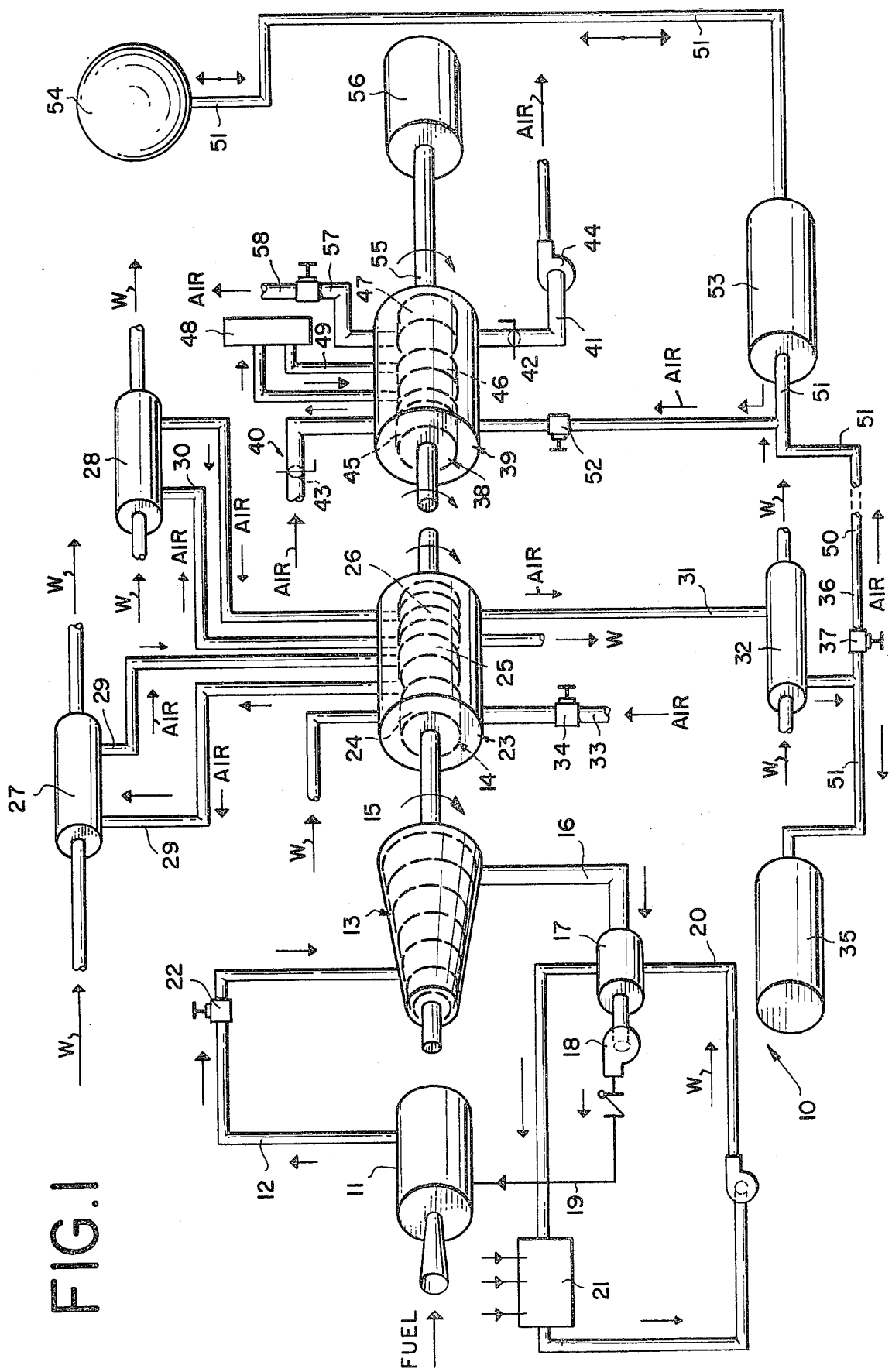
FIG. 1 is an isometric view of a steam-driven compressed gas power system with a remote gas engine.

In FIG. 1, a conventional steam turbine system 10 is shown as an exemplary prime mover. The steam turbine system includes a high pressure steam generator 11 connected by piping 12 to a multi-stage condensing turbine 13 which drives a multi-stage turbo air compressor 14 through shaft 15. The discharge steam, which can be at a very low pressure is conveyed by pipe 16 through condenser 17. The resulting condensate is pumped back to the steam generator by pump 18 through connecting pipe 19. The coolant, water in this case, the water W is circulated through the pipe 20 to the condenser 17 to absorb the latent heat of the steam and must in turn be cooled in the conventional way in the conventional arrangement by an evaporative cooling tower 21. The turbine system 10 is provided with all the necessary controls such as the valve 22 on the piping 12. The turbo-compressor 14 as shown, is a three-stage compressor including a coolant, water in this case, in the jacket 23. The compressor 14 has three stages 24, 25 and 26. There are conventional interstage coolers 27, 28 between the second and third stages 25, 26 and connected by piping 29, 30. Compressed air, which is preferably used in this embodiment of the present invention leaves the compressor 14 through piping 31 and may be further cooled in the cooler 32. The intake of air into the compressor 14 is through the pipe 33 which may be controlled by the valve 34.

Water W, flowing in the direction of the arrows, takes the heat energy from the compressor 14 by flowing through the jacket 23 and through the coolers 27, 28, 32. The energy in the heated water may be used for desired purposes. The compressed air from the compressor 14, exiting at point 36, is available for power use or for storage in a storage tank such as tank 35. The compressed air may be suitably controlled by valves such as valve 37.

The gas engine 38 in this embodiment of the present invention operates on air and is exemplified as a multi-stage turbine. The gas engine 38 preferable has jacket 39 so that the atmospheric fluids such as air passing over the gas engine 38 may be channelled for desired use.

The air enters the jacket 39 in the direction of the arrows through piping 40 and leaves the jacket 39 through piping 41. The air flow is controlled by suitable valves, such as 42, 43 and may be assisted by a blower 44.

The gas engine 38 as shown includes three stages 45, 46, 47. Compressed atmospheric air may have moisture which condenses on cooling. It is advisable to dry this air in a conventional interstage dryer 48. The compressed air is channeled to and from the dryer 48 by piping 49.

Compressed air is received into the gas engine at point 50 and carried by piping 51 into the gas engine 38. The compressed air may be controlled by a valve, such as valve 52, to pass through the piping 51 into a storage tank 53 and further piped into a solar exposed storage tank 54. Air passing through gas engine 38 passes through the stages 45, 46, 47 of the engine and is exhausted through the pipe 57 which may be controlled by a valve such as valve 58.

The output of the gas engine 38 is on a shaft 55 to drive a load such as an electrical generator 56.

The cofunctioning gas compressor 14 and gas engine 38 operate, and are designed as follows: The compressor 14 and steam turbine system are designed for optimum demand and constant speed of rotation. The greatest efficiency of the steam turbine system is found at high and constant speed. There need be no gear step-down on the shaft 15 from the steam turbine 13 to the compressor 14, thus saving the friction loss in prior art reduction gearing and the huge expense of such gears. In the generation of electricity, for instance, for sixty cycle current, the gas engine may accept compressed air and be designed to rotate at a conventional 1,800 r.p.m. The compressed air generated by the compressor 14 may be generated at the same shaft speed as the steam turbine 13 (from 2,000 to 4,000 r.p.m.).

The size of the steam turbine 13, and its concomittant costs, is substantially reduced by the reduced load on the gas compressor 14, effected by the fluid cooling of the compressor stages 24, 25, 26 by the fluid passing through the jacket 23 and the coolers 27, 28, 32.

Cooling the air in the compressor 14 reduces the power required at the compressor shaft 15. This provides more compressed air with less fuel input into the steam generator 11. Atmospheric fluid energy such as water in the coolers 27, 28, 32, at lower ambient temperature acts as a heat sink as it is circulating and captures heat energy which would otherwise be wasted as the hot compressed air cools toward ambient atmospheric temperature.

The physical process of compressing gas requires an input of mechanical energy to shaft 15, which turns the turbo compressor 14. If no heat is removed from the air during the process, the compression is said to be adiabatic. The air will reach an extremely high temperature and the compression will require a maximum of mechanical energy. If the entire heat of compression is removed from the air by some means similar to jacket 23, the air temperature remains constant at intake temperature. The compression is then said to be isothermal and will require a minimum of shaft energy. It is well known that the compression cycle requires less mechanical energy when the compression starts at a lower temperatures. For this reason, prior art multi-stage compressors use interstage coolers. If sufficient water is circulated in the interstaged coolers 27, 28, 32, the temperature of the air at each stage can be reduced almost to the temperature at intake to the first stage resulting in a minimum mechanical shaft 15 input.

If the compressed gas in transmission to the gas engine cools to below ambient atmospheric temperature, it will absorb atmospheric heat energy and may be delivered to the gas engine with a potential energy which may even exceed the potential energy of the compressed gas when originally generated.

The power generation system as shown in FIG. 1 has been exemplified by a steam turbine system 10. The steam turbine system 10 with a generator 11 fired by oil in Alaska might have its piping 31, exit at point 36 at the remote end of a pipeline extending to point 50 and entering an air engine 38 in the State of Washington, or even New York. In a remote application such as using Alaskan oil, the cooling fluid in the jacket 23 and/or the coolers 27, 28, 32 might more satisfactorily be cold Alaskan air or sea water. The long pipeline carrying compressed air would have very little power loss and in fact may gain power at the delivery end. Friction heat is absorbed back into the transmitted air. As the pipe passes through warmer ambient (or earth) temperatures, heat energy flows into the cold pipe to increase the pressure (and energy) of the transmitted air.

Optional uses for the energy of fluid warmed by the compressor might be found. For example, heated air may be used directly for the boiler combustion air to reduce the fuel input to the boiler in a manner well known to the art.

The mechanical energy on the shaft 15 need not be provided by steam. Static water power in Northern Canada might operate the compressor 14. The air expanding in the gas engine 38 reduces in temperature and is preferably optionally designed to reduce in temperature to a temperature below ambient local temperature. Thus, in the operation of the gas engine 38, the jacketing 39 or other means of providing atmospheric air flow over the gas engine 38 introduces atmospheric heat energy into the compressed air in a gas engine, increasing the potential energy of the compressed gas beyond that imparted by the original energy of generation.

It should be noted that the work of the compressed gas in the present invention is obtained by the expansion of the compressed gas. Thus as the compressed gas is expanding, work is being done, the compressed gas is cooled and when cooled below ambient air temperature is enabled to absorb energy from the atmosphere in order to do more work. Conventional compressed air applications such as pneumatic drills expel the compressed air before it has expanded to develop its entire energy in work. Thus compressed gas operates similarly to the way steam is used for power except it has the advantage of cooling as it works and, when below ambient air temperature, gains energy rather than loses it as in the case of steam.

The remote gas engine 38 might have an optional location at a central electric generating plant and the generator 56 be one large enough for central distribution of electric energy. Small gas engines 38 and generators 56 might function for local building use. Additional solar energy is further received by storage tank 54 for further additional energy and put into the power generation system of the present invention.

It is to be noted that the solar tank 54 makes available to this system as much solar energy as is presently available to solar collecting systems functioning only in a period of bright sunshine in the present state of the art. The present invention taps solar heat stored in the ambient atmosphere down to fairly low temperatures (40 degrees) both night and day; clouds or rain.

Figure 2:
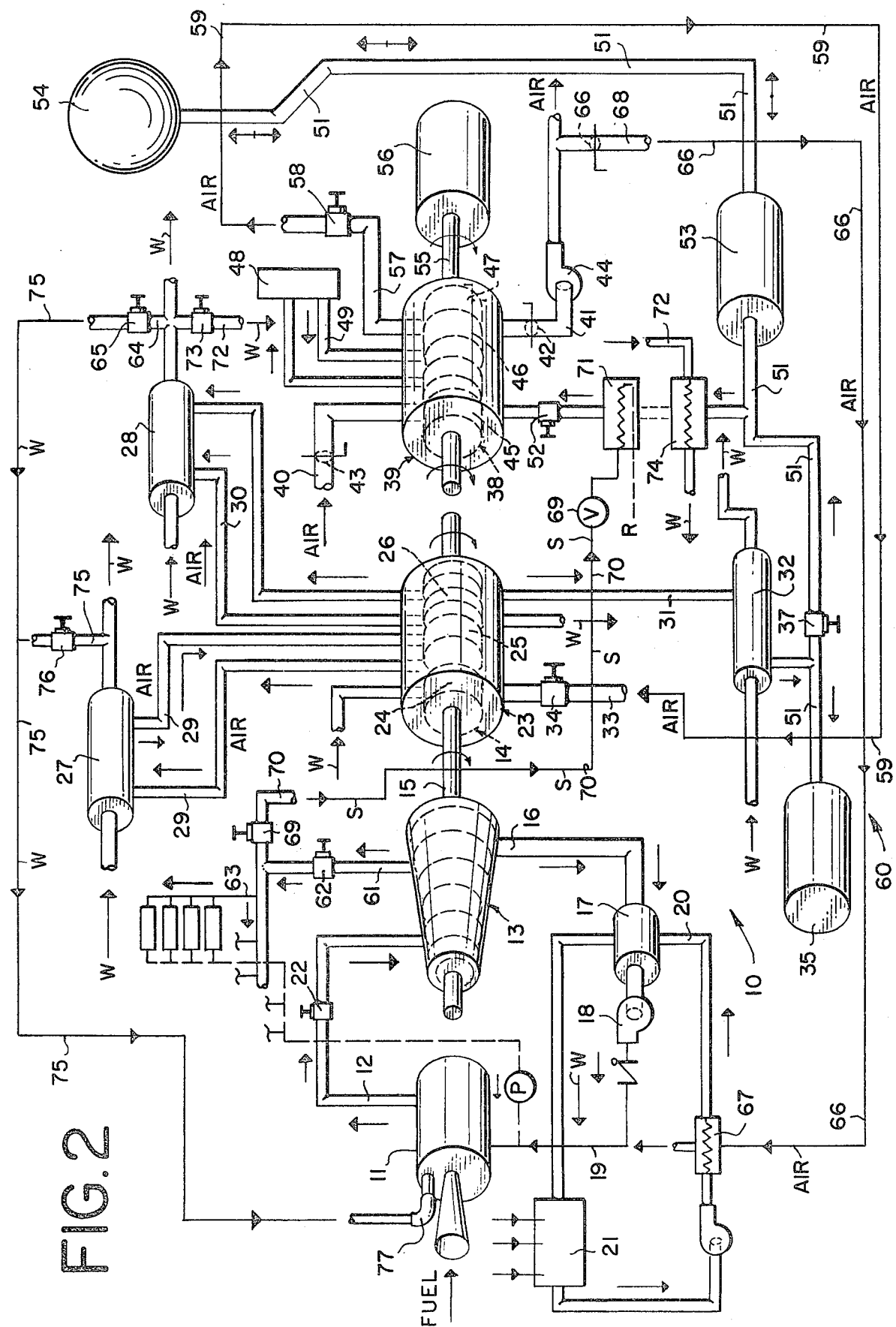
FIG. 2 is an isometric view of an integrated steam-driven compressed gas total energy system.

As shown in FIG. 2 total energy gas powered generation system 60 is adaptable for use such as in buildings.

A steam turbine system 10 includes a high pressure steam generator 11 connected by piping 12 to a multi-stage condensing turbine 13 which drives a multi-stage turbo gas compressor 14 through shaft 15. The discharge steam which can be at very low pressure is conveyed by pipe 16 through condenser 17. The resulting condensate is pumped back to the steam generator 11 by pump 18 through connecting pipe 19. The coolant, water in this case, the water W, is circulated through the pipe 20 to the condenser 17 to absorb the latent heat of the steam and must be, in turn, cooled in the conventional arrangement by an evaporative cooling tower 21. The turbine system 10 is provided with all necessary controls such as the valve 22 on the piping 12.

The turbo compressor 14 as shown is a three stage compressor including a coolant, water in this case, in the jacket 23. The compressor 14 has three stages 24, 25, 26. There are conventional interstage coolers 27, 28, between the second and third stages 25, 26 connected by piping 29, 30. Compressed gas leaves the compressor 14 through piping 31 and may be further cooled in the cooler 32. The intake gas into the compressor 14 is through the pipe 33 which may be controlled by valve 34.

Water W flowing in the direction of the arrows takes the heat energy from the compressor 14 by flowing through the jacket 23 and through the coolers 27, 28, 32. The compressed gas can be suitably controlled by valves such as valve 37.

The gas engine 38 is exemplified as a multi-stage turbine. The gas engine 38 preferably has a jacket 39 so that the atmospheric fluid, such as air, passing over the engine 38 can be channeled.

Air enters the jacket 39 in the direction of the arrows through pipeline 40 and leaves the jacket 39 through piping 41. The air flow is controlled by suitable valves such as valves 42, 43 and may be assisted by a blower 44.

The gas engine 38, as shown, includes three stages 45, 46, 47. Compressed atmospheric air may have moisture which condenses on cooling. It is advisable to dry this air in conventional interstage dryer 48. The compressed air is channeled to and from the dryer 48 by piping 49.

Compressed gas is carried by piping 51 into the gas engine 38 or the compressed gas may be controlled by a valve such as valve 52 to pass through the piping 51 into a storage tank 53 and further piped into a solar exposed storage tank 54. Gas passing through the gas engine 38 passes through the stages 45, 46, 47 of the engine 38 and is exhausted through the pipe 57 which may be controlled by a valve such as valve 58.

Optionally cool air from the compressor exiting from pipe 57 may be piped by pipe 59 to the intake pipe 33 of the compressor 14. This provides cool air for the compressor 14.

When the pipe 57 and pipe 59 are in closed circuit with the pipe 33 gases other than air may be used in the turbo compressor 14—gas engine 38 system. In such case it is advisable to use inactive gasses such as nitrogen or inert gasses such as argon or helium.

Where gas is in closed circuit the dryer 48 may be superfluous.

The output of the gas engine 38 on a shaft 55 drives an electrical generator 56.

A bleed pipe 61 controllable by valve 62 may bleed off used steam which has delivered most of its energy to shaft 15. The steam may go into a conventional radiator system 63 and be circulated back to the boiler 11.

Water W from the coolers 27, 28, 32 and jacket 33 is normally used in a domestic hot water system. A bypass such as from pipe 64 to a control valve 65 may optionally reroute preheated water to the steam generator 11 as feed water through pipe 75 and pump 77.

Air exiting the blower 44 may have bypass duct 66 leading to the piping 20 as a water cooler 67 in the steam turbine system 10 controlled by a suitable valve 68. The cooler 67 may function with or in lieu of the cooling tower 21.

Steam S controlled by a suitable valve 69 may be piped by pipe 70 to the heater 71 to further heat the compressed gas going into the gas engine 38. This steam may be steam which has already driven the turbine 13 but still has enough heat energy to heat the compressed air.

Hot water from pipe 72 controlled by a suitable valve 73 may further be used to warm the compressed gas going to the gas engine 38 by passing through a water heater 74. The heater 74 may be used in conjunction with heater 71 or in lieu of the heater 71.

A pipe 75 controlled by a suitable valve 76 may also serve pump 77 for make up water going into the boiler 11.

The total energy generation system 60 as shown in FIG. 2 used in large buildings, for instance, is designed for optimum demand and constant shaft rotations at high speeds and with no need to step down from the steam turbine 13, shaft 15 speed, to the compressor 14 just as in the case of the embodiment of FIG. 1.

Economy and energy saving are effected by directing the cool air via pipe 66 to the cooler 67 to aid in condensing the steam. Piping the heated water through pipe 64 to feed the boiler 11 through the pump 77 is also a saving.

Saving is made by conventionally recirculating the steam to the boiler from the radiator system 63.

Bleeding from the steam turbine 33 to the preheater 71 is a further economy as well as using hot water to heater 74.

The total energy system of FIG. 2 provides electricity for a building from the generator 56, hot water and cool air. In low demand compressed gas may be stored in tanks 35, 53, 54.

Tank 54 may absorb direct solar energy during daylight hours and store such energy in the compressed gas. The tanks 35, 53 may be placed in warm areas to further absorb ambient air energy.

Under optimum circumstances, the storage of energy in compressed gas and hot water and arrangements to cross heat and cross cool allows a design for all seasons of use with a relatively small size system to meet peak demand and allows for the total energy system to function at substantially constant shaft 15 speed.

By way of example, jacket 23 water and coolers 27, 28 may receive water at 40 degrees fahrenheit to cool the discharge gas from the compressor 14 which is raised to 150 degrees. Such water will be raised to 130 degrees and is useful at this temperature for domestic hot water. During periods of low demand, such as on a temperate night, excess energy may be stored in tank 54 for use as daytime energy. In the daytime, additional solar energy is absorbed from the sun's rays. A particular advantage of the present invention is that the stored solar energy in the atmosphere is available whether or not the sun is out, since the gas engine 38 when operating below ambient air temperature may absorb heat energy form atmospheric air at almost any temperature.

The present invention has been described in FIG. 2 with a preferred steam prime mover turbo compressor and gas turbine engine. For the performance of the same functions, as internal combustion engine such as a diesel or gasoline engine drive on shaft 15 or a steam reciprocating engine, for instance, might be used. The compressor might also be in a form other than a turbo compressor and the gas engine might be a piston engine. Compressed gas, for instance, is substitutable in steam engine drives without the steam heat energy loss to the atmosphere.

Figure 3:
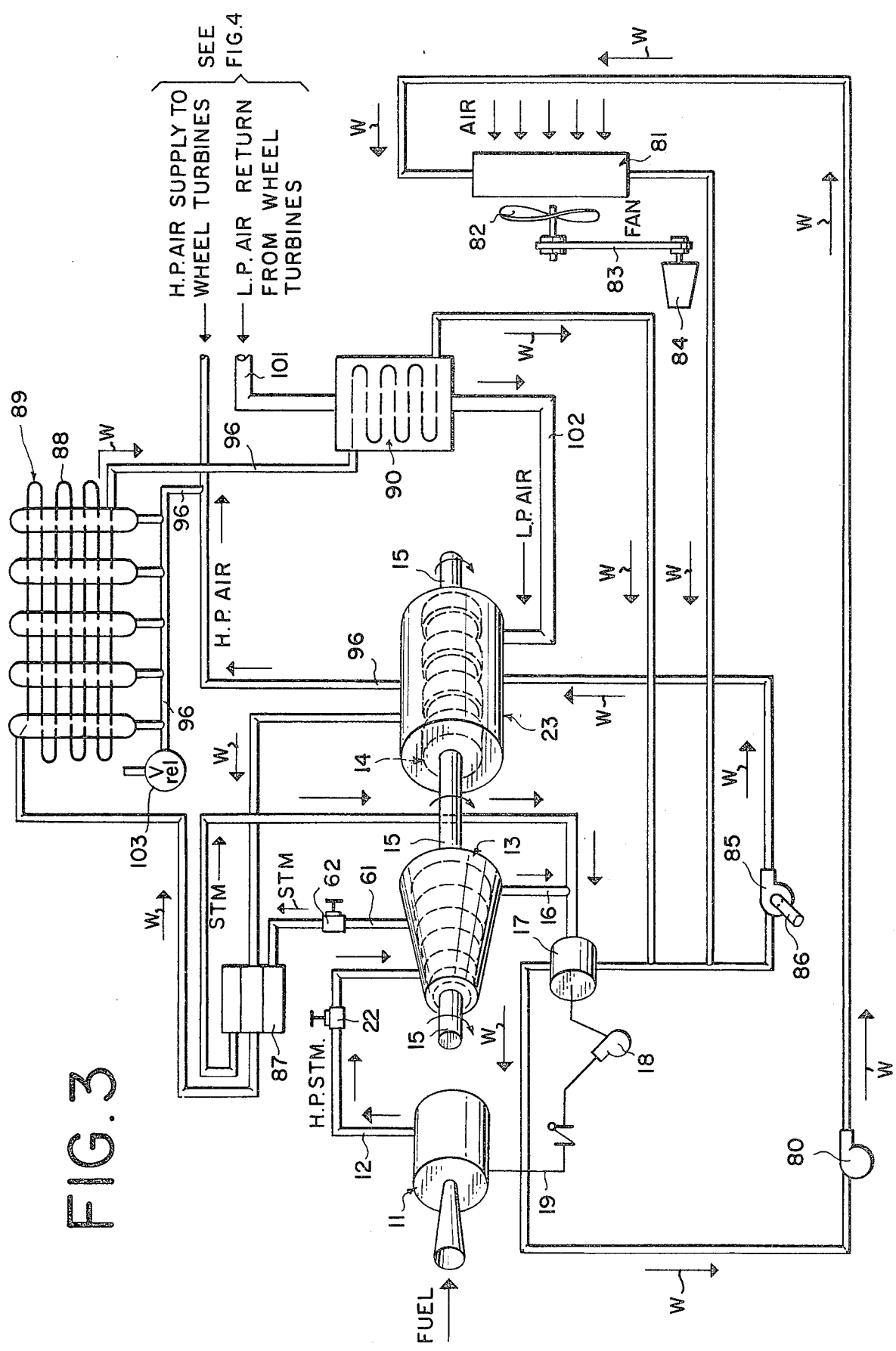
FIG. 3 is an isometric view of a steam-driven compressor-engine system for driving a vehicle.

In FIG. 3 a power system of the present invention producing compressed gas for use in a moving vehicle is shown. A high pressure steam generator 11 connected by piping 12 to a multi-stage condensing steam turbine 13 drives a multi-stage turbo gas compressor 14 through shaft 15. The discharge of steam is conveyed by pipe 16 through condensor 17. Condensate is pumped back to the high pressure steam generator 11 by pump 18 through connecting pipe 19. The water is circulated through the condenser by pump 80. The water is cooled by the air cooled radiator 81. A fan 82 on a belt 83 driven by a small auxiliary gas turbine 84 draws air through the radiator 81 when the vehicle is stationary.

Figure 4:
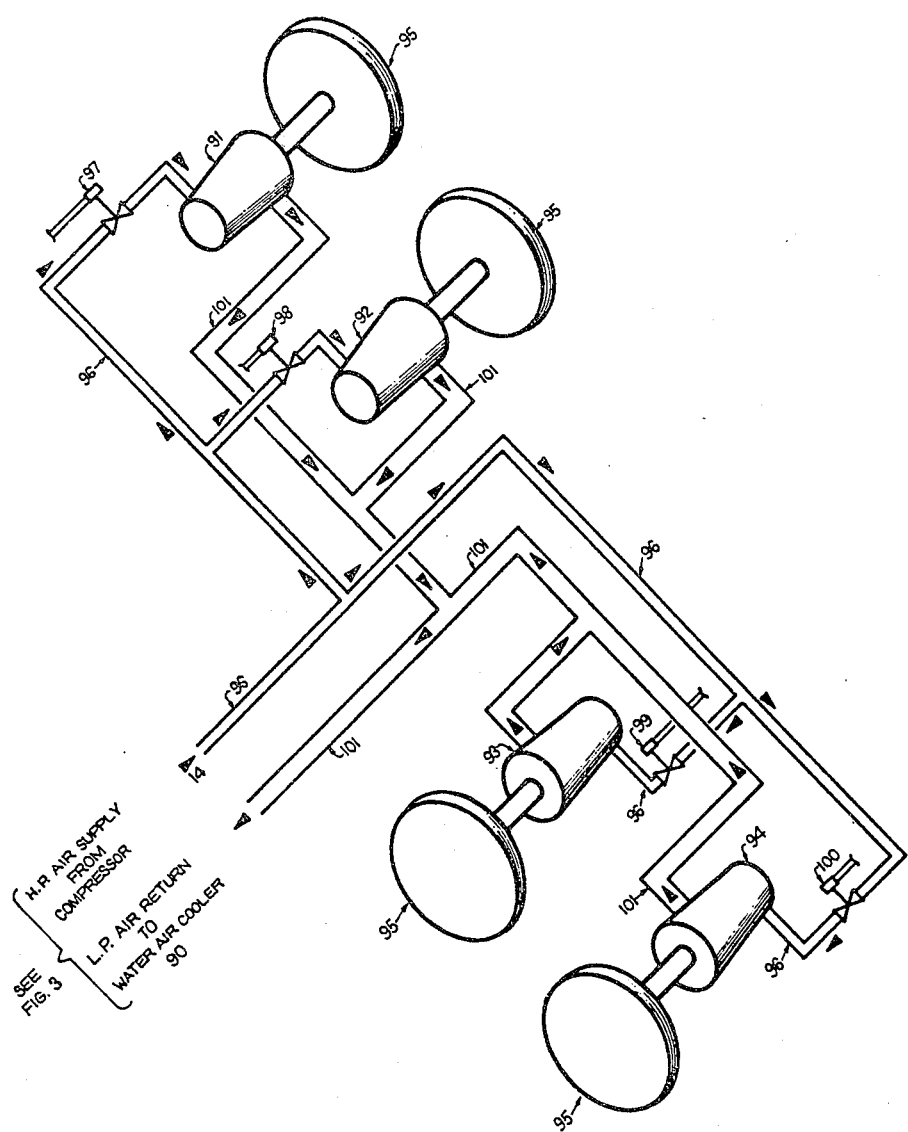
FIG. 4 is an isometric view of the wheel drive for FIG. 3.

Water is also circulated by pump 85 driven by auxiliary gas turbine 86 into the water jacket 23 around the compressor 14. Water leaving the jacket 23 is circulated through a steam heater 87 and then circulated in coils 88 around the gas storage tanks 89. Water from the jacket 23 is again cooled by being circulated through a water/gas heat exchanger 90. FIG. 4 discloses the turbine units 91, 92, 93, 94 for driving the wheels 95. Compressed gas is received by the turbines 91, 92, 93, 94 from the power system shown in FIG. 3 from pipe 96. The speed and power applied to the wheels 95 is controlled by pneumatic valves 97, 98, 99, 100, which are coordinated from a central point (not shown). Gas discharged from the turbines 91, 92, 93, 94 at low pressure and temperature is conveyed through pipes 101 to the water/gas cooler 90 in FIG. 3 and then conveyed back to the compressor 14 through the pipe 102.

In operation, the motor vehicle power system of FIGS. 3 and 4 is adapted to operate from a constantly rotating shaft 15 avoiding the problems of the past steam vehicles of having variable fuel firing. As a safety measure, particularly when air is used, excess compressed air from idling is stored in the storage tanks 89 which have a relief valve 103 to protect against over pressure. Suitable air intake means to keep the system functioning (not shown) is provided in a conventional manner. Provision for additional water is provided in a conventional manner (not shown).

In general operation the power system functions as in the embodiment of FIGS. 1 and 2. The compressed gas enters the turbines 91, 92, 93, 94, expands to below ambient air temperature and thus the compressed gas absorbs heat energy in the ambient air as the gas decompresses and cools from the stored ambient energy.

Figure 5:
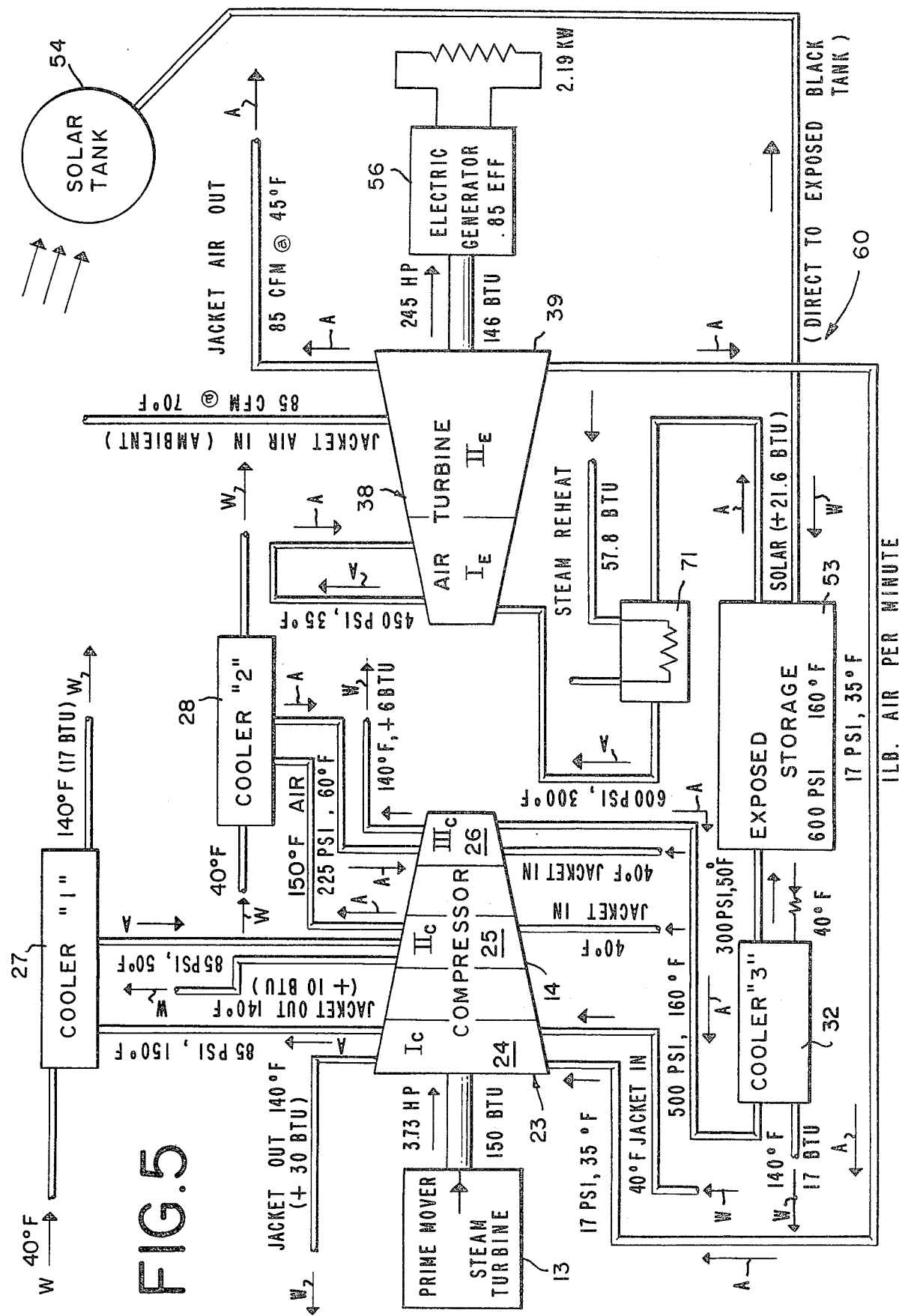
FIG. 5 is an energy flow diagram of a power system such as shown in FIG. 2.

FIG. 5 is a schematic of a total energy system such as shown in FIG. 2 using air. The mechanical efficiency of the compressor 14 is assumed at 90% and the overall efficiency of the steam turbine 13 at 85%. These are usual values found in actual machines. The friction heat of work in the gas engine 38 is transmitted to the compressed air and therefore adds to the useful output. The flow of energy is based on one pound of air per minute going through the compressor 14 and the gas turbine 38 with no storage. Air is received in closed circuit from the air discharged by the gas engine 38 at 17 PSI, 35 degrees Fahrenheit, and compressed to 500 PSI in three stages 24, 25, 26, with jacket water cooling 23 and interstage coolers 27, 28, 32 to a final condition of 500 PSI, 150 degrees Fahrenheit. The air expands in the gas engine 38 to 17 PSI, 35 degrees Fahrenheit, as close to isothermally as the heat input from ambient air permits. The prime mover supplies 3.73 H.P., to the shaft; the generator 56 is output 1.85 KW. The total heat output from the compressor 14 is 243 BTU. This consists of 146 BTU in the compressed air and 97 BTU in the hot water obtained from the jacket 23 and interstage cooling. The compressed air heat input to the gas engine 38 is 146 BTU; the other heat input to the gas engine 38 is from the surrounding air. This results in a net heat output of 124 BTU (shaft H.P. of 2.912) plus the discharge of 112

CFM jacket 39 air at 45 degrees Fahrenheit for air conditioning which is equivalent to 0.353 tons of cooling, usually requiring about 0.353 H.P. equivalent to 15 BTU.

To understand the significance of the above energy flow, it is necessary to express H.P., KW, and BTU in the same energy units as follows:

1 H.P.=0.745 KW=42.4 BTU/Min.=33,000 Lb. Ft./Min.
1 KW=1.340 HP=56.8 BTU/Min.=44,220 Lb. Ft./Min.
1 BTU/Min.=0.0176 KW=0.236 HP=778 Lb. Ft./Min.

The total fueled shaft input is 3.73 H.P.=123,090 Lb.Ft./Min.=158.2 BTU.

The net output is 2.912 shaft H.P.+97 BTU Hot Water+0.353 H.P. Cooling=124 BTU+97 BTU+15 BTU=236 BTU.

The net system useful output is therefore 1.49×input.

This would appear to be a violation of the Second Law of the Conservation of Energy. Actually, the surplus output is due to the energy absorbed from the atmosphere in the controlled expansion of air in the gas engine 38 and in the heat removed from the compressor 14 by jacket 23 and interstage cooling.

The heat removed from the compressor 14 is computed by taking the difference between the intrinsic heat per pound of air at the theoretical high temperature which would be reached with adiabatic (no heat loss) compression and that at actual conditions with jacket 23 and interstage cooling. The compressor 14 cooling actually results in a flow of energy from the theoretical adiabatic temperatures which would be very high in the order of 400 degrees Fahrenheit, to the temperature of the hot water at 140 degrees Fahrenheit.

By using available low-temperature water for cooling, the world's reservoir of low-temperature water is slowly warmed. Low entropy heat is continually rising in both temperature and entropy and eventually will result in static heat energy at zero flow of heat to low-temperature water. However, within the time frame of our own energy crunch, this source of energy (essentially solar in origin) is still available and should be used to conserve fossil fuel. The flow of heat into the gas engine 38 is essentially of the same nature. Heat at comparatively higher temperature air (ambient 60°) is transferred to lower temperature air at 35° F.

From this viewpoint, the compressor 14—gas engine 38 machine can be considered as mechanical power derived from fossil fuel used to compress ambient air to high temperature levels. Some of this heat is drained off to heat water from natural temperatures to 140°. The heat which remains in the discharge air is at high pressure but this heat is partially recovered as mechanical power. It is a characteristic of gasses that the temperature also drops as heat flows back into mechanical power. When the gas temperature reaches a point in expansion below ambient air temperature, heat flows into the engine from the atmosphere and is available for additional mechanical energy. The ambient air is cooled in giving up its heat to the gas engine. If the volume and rate of this air flow is regulated to the gas engine output, this air can be reduced to 45°, an ideal temperature for air conditioning. Note that this is the jacket 39 air flowing around the air engine 38, not the gas inside the engine 38 which is in closed circuit to return to the compressor 14.

With the addition of storage tank 53, solar heat storage tank 54 and steam reheater 71, additional energy is gained by the total energy system 60. When solar heat is available at 150° F., the input through the storage tank 54 may be obtained from this source, an additional 21.6 BTU/Min., making the shaft output 3.17 H.P., or 135 BTU/Min. The heat outputs for hot water and cooling remain the same. This is a direct transfer of 21.6 BTU of solar heat to an increase of 0.258 H.P., or 10.9 BTU. The overall efficiency from solar heat to power is thus 50% which far exceeds any existing transfer process from solar heat to power.

Additional shaft power can be obtained by reheating in the heater 71 with steam to 300° F. With a heat input of 57.8 BTU per lb., the shaft horsepower goes up to 3.45, an increase of 0.53 H.P., or 22.5 BTU. This is an overall thermal efficiency of 39 percent. In the best condensing steam turbines 27 lb./H.P. Hr.=27,000 BTU/Hr.=450 BTU/Min. One horsepower minute output=42.4BTU/Min. The thermal efficiency is therefore only 9%. 450 BTU/Min., transferred by reheat to compressed air would result in an output of 176 BTU or 4.139 H.P., an efficiency of 39%.

With only stream reheat added the total fueled input to the system is the shaft input plus the reheat, 158 BTU+58 BTU=216 BTU. The shaft output increases by 22.5 BTU making the total system output now 236 BTU+23 BTU=259 BTU. This net output with reheat is therefore 1.20×input but a larger part of the output is in shaft H.P. Solar heat can supply this reheat up to 150° F., requiring only 29 BTU from fuel. The net output is then 1.39×the fuel input.

Figure 6:
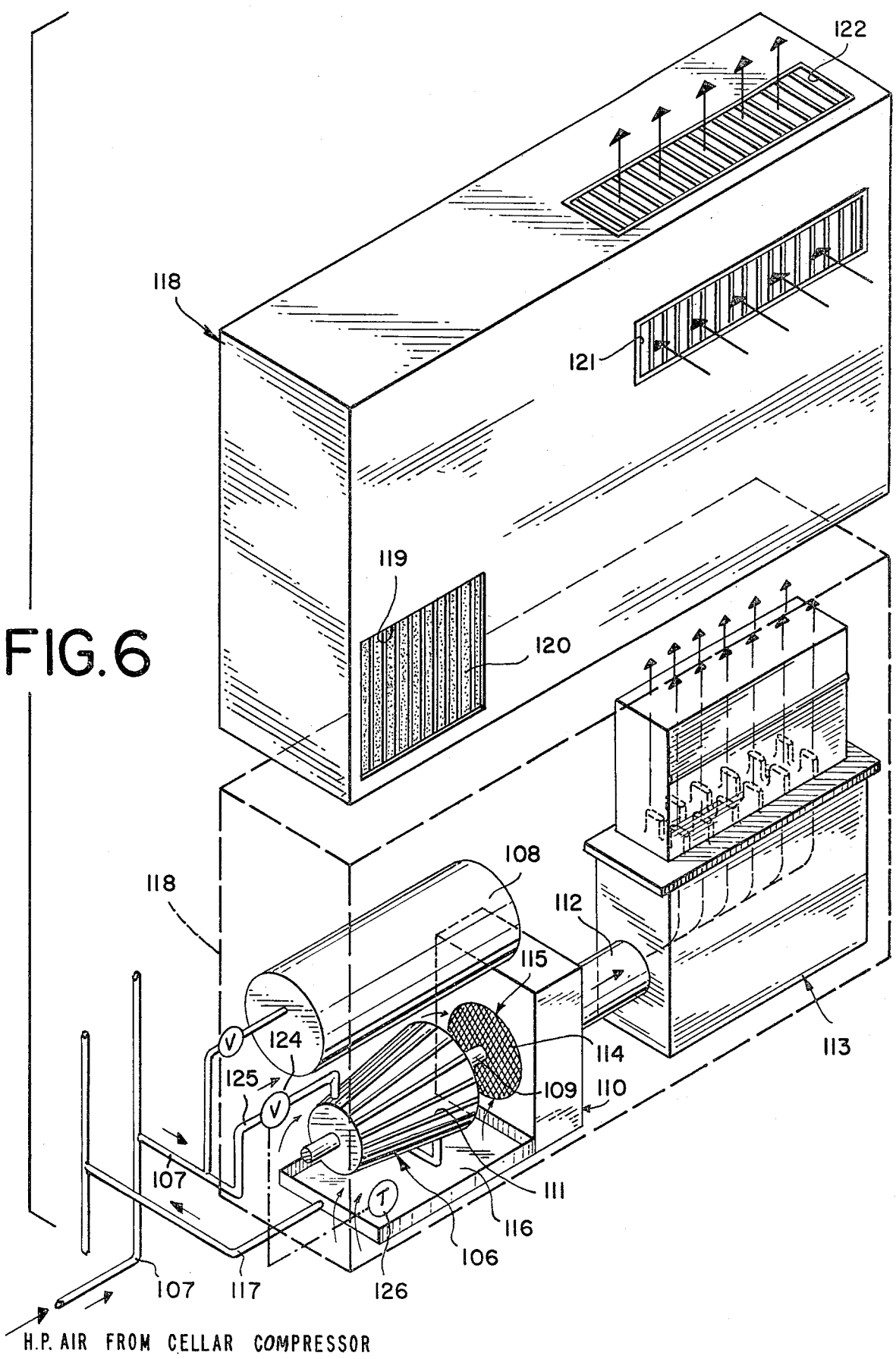
FIG. 6 is an exploded view of an air engine system of the present invention for cooling air.

In FIG. 6 the gas engine component of the multipurpose compressed gas power generation system is a turbine 106 driven by compressed air from a compressed air source such as shown in FIG. 2. The air passed through the pipe 107 into the turbine 106 and to a storage tank 108.

The turbine shaft 109 drives an in-line blower 110 of convention design. Blower 110, draws hot air from the room over the finned casing 111 of the turbine 106 and discharges the cooled room air through duct 112 to a conventional induction unit 113. The compressed air which has given up its power in driving the turbine 106 is directed on discharge into the intake of blower 110 to join with the room air passing through blower 110. The blower 110 has a fine mesh screen 114 at its inlet 115 to keep condensed moisture droplets from passing through. The moisture which drops out of the hot primary room air in passing over the cool turbine 106 is collected in pan 116. Condensate is drained out in a system of drain pipes 117.

The enclosure 118 has an intake opening 119, preferably including a filler 120 and an induced air intake 121 and air discharge outlet 122.

In operation, the casing 111 facilitates the transfer of heat from the external room air which is a high temperature (80° F.) to the expanding compressed air inside the casing (35° F.).

The blower 110 discharges the cool room air and turbine discharge (primary air 35°) through jets in the induction unit 113 at high velocity. The enclosure 118 fits around the induction unit 113 in the form of a venturi. When the primary air passes through the neck of the venturi at high velocity, the static pressure drops very low. This draws additional hot room air (80° F.) into the flow of air (secondary air 80° F.) through the air intake 121. The mixture of primary and secondary air is then discharged through the outlets 122 into the room at a mixed temperature (55°-58° F.) to cool the room.

The rate of compressed air flow into the turbine 106 is controlled by valve 124. Valve 124 is self actuated by an air pressure diaphragm fed by a small tube 125, connected to the pipe 107. When the thermostat 126, placed in the room return air stream is satisfied, valve 124 closes and the turbine 160 stops. Compressed air continues to flow through pipe 107 into the storage tank 108 until the back pressure equals the incoming air pressure. The compressed air in the tank 108 will absorb heat energy from ambient air above the temperature of the air in the tank 108.

Cooling would also be affected without the compressed air from the turbine 106 being discharged where such air is in a closed circuit (not shown).

The terms and expressions which are employed are used in terms of description; it is recognized, though, that various modifications are possible.

It is also understood that the following claims are intended to cover all of the generic and specific features of the invention herein described, and all statements of the scope of the invention which, as a matter of language, might fall therebetween.

Having described certain forms of the invention is some detail, what is claimed is:

1. A gas-powered engine adapted to utilize stored solar heat energy in atmospheric fluid comprising a turbine, said turbine adapted to be driven by compressed gas, said driving gas decompressible in driving to reduce said turbine temperature below ambient atmospheric fluid temperature, and means to flow atmospheric fluid at ambient atmospheric temperature in contact with said gas turbine, whereby heat energy in said fluid is transferred to said driving gas in said turbine.

2. The invention of claim 1 wherein said means to flow atmospheric fluid in contact with said gas turbine includes jacketing means.

3. The invention of claims 1 or 2 wherein said means to flow atmospheric fluid in contact with said gas turbine includes blower means.

4. The invention of claim 1 wherein said gas turbine is a multistage turbine.

5. The invention of claims 1 including means to heat compressed gas going into said gas turbine.

6. The invention of claims 1 including means for gas in said gas turbine to receive radiant solar energy.

7. The invention of claim 1 including compressed gas storage means, said compressed gas storage means operationally connected to said turbine, and means to optionally control said compressed gas from said compressed gas storage means to drive said turbine.

8. The invention of claim 7 wherein said compressed gas storage means is adapted to absorb heat energy.

9. The invention of claim 7 wherein said compressed gas storage means is adapted to absorb radiant solar energy.

10. The invention of claim 1 wherein said turbine is adapted to drive a blower, and said means to flow atmospheric fluid is said blower adapted to circulate atmospheric air over said turbine, said blower further adapted to blow said atmospheric air circulated over said turbine into an air-conditioning system.

11. A power generation system adapted to utilize stored solar heat energy in atmospheric fluid comprising, a prime mover, a gas compressor, said prime mover adapted to driving said gas compressor, said gas compressor including a compressor cooling jacket means, means to flow a fluid through said compressor cooling jacket means, said fluid normally at a temperature below the operating temperature of said compressor, and a gas turbine, said gas turbine adapted to be driven by gas from said gas compressor, said driving gas from said gas compressor decompressible in driving to reduce said turbine temperature below ambient atmospheric fluid temperature, said turbine including means to flow atmospheric fluid at ambient atmospheric temperature in contact with said gas turbine, whereby heat energy in said atmospheric fluid is transferred to said driving gas in said turbine.

12. The invention of claim 11 including means from the exit point of gas used by said gas turbine to conduct said exiting gas to a gas intake point of said compressor.

13. The invention of claim 11 including means from said turbine to conduct fluid cooled by said turbine to cool gas being compressed by said compressor.

14. The invention of claim 11 including means from said compressor cooling jacket means to flow said cooling jacket fluid to heat water in a water system.

15. The invention of claim 11 including means to heat compressed gas going into said gas turbine.

16. The invention of claim 11 including means for gas in said gas turbine to receive radiant solar energy.

17. The invention of claim 11 including compressed gas storage means, said compressed gas storage means operationally connected to said turbine, and means to optionally control said compressed gas from said compressed gas storage means to drive said turbine.

18. The invention of claim 17 wherein said compressed gas storage means is adapted to absorb heat energy.

19. The invention of claim 17 wherein said compressed gas storage means is adapted to absorb radiant solar energy.

20. In a vehicle including a plurality of wheels, a gas-powered engine adapted to utilize stored solar heat energy in atmospheric fluid comprising a turbine, said turbine adapted to be driven by compressed gas, said driving gas decompressible in driving to reduce said turbine temperature below ambient atmospheric fluid temperature, means to flow atmospheric fluid at ambient atmospheric temperature in contact with said gas turbine, whereby heat energy in said fluid is transferred to said driving gas in said turbine, and means from said turbine adapted to drive at least one wheel of said vehicle.

21. In a vehicle including a plurality of wheels, a power generation system adapted to utilize stored solar heat energy in atmospheric fluid comprising, a prime mover, a gas compressor, said prime mover adapted to driving said gas compressor, said gas compressor including a compressor cooling jacket means, means to flow a fluid through said compressor cooling jacket means, said fluid normally at a temperature below the operating temperature of said compressor, a gas turbine, said gas turbine adapted to be driven by gas from said gas compressor, said driving gas from said gas compressor decompressible in driving to reduce said turbine temperature below ambient atmospheric fluid temperature, said turbine including means to flow atmospheric fluid at ambient atmospheric temperature in contact with said gas turbine, whereby heat energy in said atmospheric fluid is transferred to said driving gas in said turbine, and means from said turbine adapted to drive at least one wheel of said vehicle.

* * * * *